US 6,679,238 B2

(12) United States Patent
Nebiyeloul-Kifle et al.

(10) Patent No.: US 6,679,238 B2
(45) Date of Patent: Jan. 20, 2004

(54) EXHAUST GAS TEMPERATURE DETERMINATION AND OXYGEN SENSOR HEATER CONTROL

(75) Inventors: Yonas Nebiyeloul-Kifle, Wellesley, MA (US); Kenneth C. Swartz, Commerce Township, MI (US); Eric H. Gassenfeit, Grosse Pointe Park, MI (US)

(73) Assignee: General Motors Corporation, Detroit, MI (US)

( * ) Notice: Subject to any disclaimer, the term of this patent is extended or adjusted under 35 U.S.C. 154(b) by 98 days.

(21) Appl. No.: 10/101,988

(22) Filed: Mar. 19, 2002

(65) Prior Publication Data

US 2003/0178016 A1 Sep. 25, 2003

(51) Int. Cl.[7] ............................................... F02D 41/00
(52) U.S. Cl. ........................................ 123/676; 123/697
(58) Field of Search ................................. 123/676, 697, 123/434, 672, 673, 674; 73/23.32; 204/425, 426

(56) References Cited

U.S. PATENT DOCUMENTS

| 4,708,777 | A | | 11/1987 | Kuraoka |
| 4,742,808 | A | | 5/1988 | Blumel et al. |
| 4,768,485 | A | | 9/1988 | Brandner et al. |
| 5,091,698 | A | | 2/1992 | Grabs |
| 5,129,258 | A | | 7/1992 | Homeyer |
| 5,291,673 | A | | 3/1994 | Hamburg et al. |
| 5,497,655 | A | | 3/1996 | Gee et al. |
| 5,719,778 | A | | 2/1998 | Suzumura et al. |
| 5,852,228 | A | | 12/1998 | Yamashita et al. |
| 5,908,468 | A | * | 6/1999 | Hartmann .................... 710/316 |
| 6,029,641 | A | * | 2/2000 | Suzuki et al. ................ 123/673 |
| 6,502,556 | B2 | * | 1/2003 | Wienand et al. ............. 123/478 |
| 6,561,061 | B1 | * | 5/2003 | Stepan ......................... 81/9.51 |

* cited by examiner

*Primary Examiner*—John Kwon
(74) *Attorney, Agent, or Firm*—Leslie C. Hodges

(57) ABSTRACT

A method and apparatus determine exhaust gas temperature and control the heater of a heated exhaust gas oxygen sensor. Heater failures are diagnosed based on the level of current flowing through the heater. Exhaust gas temperature is determined by using a Kalman filter. The exhaust gas temperature sensor is eliminated while maintaining a high degree of accuracy. Current flowing through the heater is used to calculate the temperature of the heater. The temperature of the heater is compared to a desired temperature range and the current to the heater is adjusted to maintain the desired temperature range.

20 Claims, 4 Drawing Sheets

EXHAUST GAS TEMPERATURE DETERMINATION AND OXYGEN SENSOR HEATER CONTROL

FIELD OF THE INVENTION

This invention relates to control systems for an internal combustion engine, and more particularly to the measurement of exhaust gas temperature and the control of a heater of an exhaust gas oxygen sensor for an internal combustion engine.

BACKGROUND OF THE INVENTION

There are many strategies for controlling the air-to-fuel ratio (A/F ratio) of an internal combustion engine. One approach measures the concentration of oxygen in the exhaust gas. A controller uses the oxygen concentration to control the A/F ratio. An oxygen sensor is used to sense the concentration of oxygen in the exhaust gas. The oxygen sensor must be operated within a specific temperature range to accurately sense the concentration of oxygen in the exhaust. Typically, the oxygen sensor must be operated between 650 and 850° C. to provide accurate results. Until the sensor reaches the operating temperature range, the output of the oxygen sensor cannot be used to control the A/F ratio. A heater is used to raise and maintain the temperature of the oxygen sensor within the operating temperature range. If current continues to flow through the heater after the oxygen sensor reaches the operating temperature range and the exhaust temperature is high, the heater overheats and may be damaged.

Monitoring exhaust gas temperature is also important for emissions control. The level of emissions processed by the catalytic converter is dependent upon the temperature of the catalyst. The temperature of the catalyst, in turn, depends on the exhaust gas temperature. The exhaust gas temperature must be monitored to prevent the catalytic converter from overheating. Usually, the exhaust gas temperature is measured using a sensor or is calculated from the operating conditions of the engine. The use of a temperature sensor is more accurate but generally costs more than using estimation techniques.

SUMMARY OF THE INVENTION

In a vehicle including an engine, an exhaust, and an exhaust gas oxygen sensor with a sensor heater, a system according to the present invention estimates exhaust gas temperature. The system includes a first sensor that measures heater current though the heater. A second sensor measures a first engine operating parameter. A controller communicates with the first and second sensors and calculates an exhaust gas temperature value using a Kalman filter.

In other features of the invention, the Kalman filter receives the first engine operating parameter and the heater current as inputs. The second sensor is a mass flow rate sensor and the first engine operating parameter is a mass flow rate of the exhaust gas.

In yet other features, the controller maintains a temperature of the heater within an operating temperature range. A voltage sensor generates a sensor voltage signal based on voltage across the exhaust gas oxygen sensor. The controller calculates current through the heater based upon the sensor voltage signal and a sensor resistance. The controller calculates total resistance based upon the current through the heater and a voltage drop across the heater. The controller calculates a resistance of the heater based on a difference between the total resistance and the sensor resistance. The controller calculates a temperature of the heater based on the heater resistance. The controller calculates an error signal based on a difference between the heater temperature and the operating temperature range and varies a temperature of the heater based on the error signal. The controller generates an estimate of oxygen concentration in the emissions.

In other features of the invention, the exhaust gas temperature is used to control at least one of engine diagnostics and engine control.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The various features, advantages, and other uses of the present invention will become more apparent by referring to the following detailed description and drawings in which.

DETAILED DESCRIPTION OF THE PREFERRED EMBODIMENTS

Figure 2:
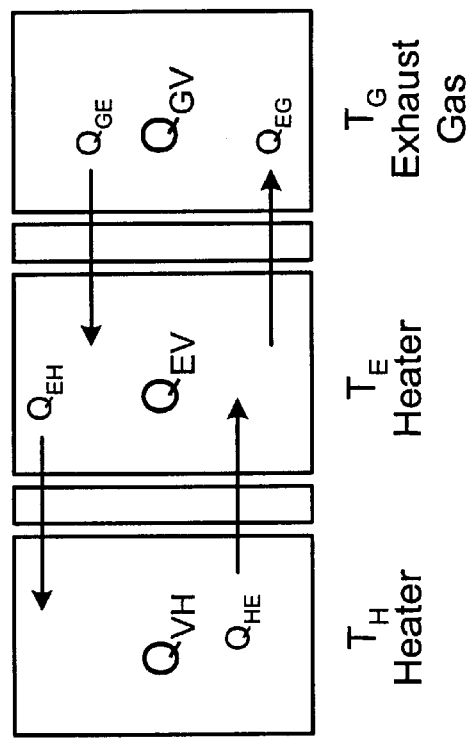
FIGS. 1 and 2 illustrate heat transfer in a heated exhaust gas oxygen sensor.
Figure 1:
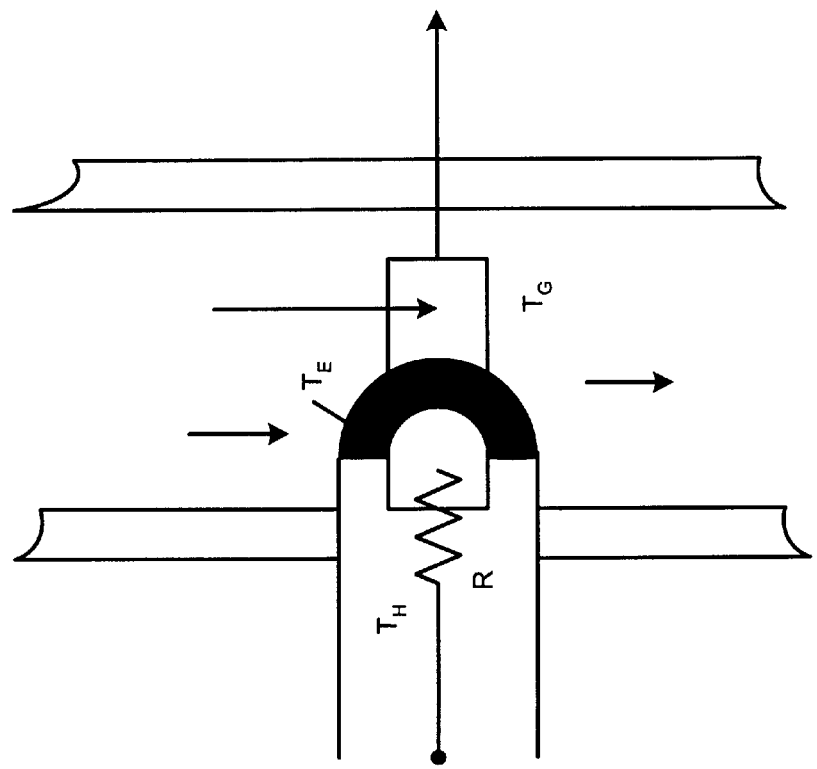

The following description of the preferred embodiment(s) is merely exemplary in nature and is in no way intended to limit the invention, its application, or uses.

The first law of thermodynamics for a closed system containing a fixed mass of a solid over a time interval $\Delta t(s)$ states that the change in internal energy within the system is equal to the heat transferred into the system plus the heat generated within the system.

$$\frac{du}{dt} = \dot{Q} + \dot{Q}_v$$

where $\frac{du}{dt}$ = Change in internal energy within the system $\dot{Q}$ = Heat transferred into the system $\dot{Q}_v$ = Heat generated within the system Therefore, the oxygen sensor sub-system is defined using the following three relations for the system.

$$e_H v_H c_{v_H} \frac{dT_H}{dt} = \dot{Q}_{VH},$$

-continued $$e_H v_E c_E \frac{dT_E}{dt} = \dot{Q}_{EH} + \dot{Q}_{v_E} + \dot{Q}_{E_g},$$

$$e_g v_g c_p \frac{dT_g}{dt} = \dot{Q}_{gE} + \dot{Q}_{v_g},$$

The amount of heat transferred from the element to the exhaust gas is approximately 0. The heat transferred from the element to the exhaust gas +e,dot $Q_{E_g}$+ee =0. There is no heat generated within the element and the exhaust gas therefore both +e,dot $Q_{V_E}$+ee and +e,dot $Q_{V_g}$+ee =0. Hence, we have the following equations to define the sub-system.

$$e_H v_H c_{v_H} \frac{dT_H}{dt} = \dot{Q}_{VH},$$

$$e_E v_E c_{v_E} \frac{dT_E}{dt} \equiv \dot{Q}_{EH},$$

$$e_g v_g c_{p_s}, \frac{dT_g}{dt} \equiv \dot{Q}_{gE},$$

where, $$\dot{Q}_{HE} = \frac{K_H A_H}{L_H}(T_H - T_E)$$

where $$\frac{K_H A_H}{L_H}$$

is the thermal resistance of the heater and $e_H v_H c_{V_H}$ is the thermal capacitance.

$$\dot{Q}_{EH} = \frac{K_E A_E}{L_E}(T_H - T_E),$$

where $$\frac{K_E A_E}{L_E}$$

is the thermal resistance of the element and $e_H v_H c_{V_H}$ is the thermal capacitance. +e,dot $Q_{VH}$+ee =$Ri^2$. where $R_H$=$K_o$+ $K_1 T_H$−273$K_1$+e,dot $Q_{g_E}$+ee =$h_c(T_g-T_E)$ where $h_c$ is the convective heat transfer coefficient.

The convective heat transfer coefficient is given by $$h_c = \frac{.023 K_g^{.6} e_g^{.4} c_{P_g}^{.4}}{D_g^2 v v_g^4} S_g^{.8}$$

and the velocity of exhaust is related to the mass flow rate of exhaust gas as follows: m=$e_g A_{P_g} S_g$. Therefore, we have $$S_g = \frac{m}{e_g A_{P_g}}.$$

Substituting into $h_c$ gives $$h_c = \frac{.023 K_g^{.6} e_g^{-.4} c_{P_g}^{.4}}{D_g^2 v v_g^4 A_{P_g}^{.8}} m^{.8}.$$

Finally, the system equations that define the oxygen sensor heater sub-system are:

$$e_H v_H c_{vH} \frac{dT_H}{dt} = K_o i^2 + K_1 T_H i^2 - 273 K_1 i^2, \quad (1)$$

$$e_E v_E c_{vg} \frac{dT_E}{dt} = \frac{K_E A_E}{L_E} T_H - \frac{K_E A_E}{L_E} T_E, \quad (2)$$

$$e_g v_g c_{p_g} \frac{dT_g}{dt} = h_c T_g - h_c T_e, \quad (3)$$

Let, $$B = \frac{.023 K^{.6} e_g^{-.4} c_{P_g}^{.4}}{D_g^2 v_g^4 A_{P_g}^{.8}},$$

Then, after rearranging and substituting for the convective heat constant, the system is defined as, $$\frac{dT_H}{dt} = \frac{K_o}{e_H v_H c_{v_H}} i^2 + \frac{K_1}{e_H v_H c_{v_H}} T_H i^2 - \frac{273 K_1}{e_H v_H c_{v_H}} i^2, \quad (1)$$

$$\frac{dT_E}{dt} = \frac{K_E A_E}{L_E e_E v_E c_{vE}} T_H - \frac{K_E A_E}{L_E e_E v_E c_{vE_H}} T_E, \quad (2)$$

$$\frac{dT_g}{dt} = \frac{B}{e_g v_g c_{p_g}} m^{0.8} T_g - \frac{B}{e_g v_g c_{p_g}} m^{0.8} T_E, \quad (3)$$

$P_H$=Density of heater material [kg/m$^3$]. $P_E$=Density of element material [kg/m$^3$]. $P_G$=Density of exhaust gases [kg/m$^3$]. $V_E$=Volume of element [m$^3$]. $V_H$=Volume of heater [m$^3$]. $C_E$=Constant volume specific heat of element [J/kg ° K]. $C_H$=Constant volume specific heat of heater [J/kg ° K]. $C_{PG}$=Constant pressure specific heat of heater[J/kg ° K]. $T_H$=Heater temperature [° K]. $T_E$=Element temperature [° K]. $T_G$=Exhaust gas temperature [° K]. $K_O$=Heater resistance [Ω]. $K_I$=Heater coefficient [Ω/° C.]. $h_c$=Convective heat transfer coefficient in [w/m$^2$ K]. $S_g$=Velocity of exhaust gases [m/s]. $K_g$=Thermal conductivity of exhaust gas [w/m K]. $K_H$=Thermal conductivity of heater [w/m K]. $K_E$=Thermal conductivity of sensor element [w/m K]. $D_g$=Exhaust gas pipe diameter [m]. $V_g$=Volume of exhaust gas [m$^3$]. $vv_g$=Kinematic viscosity of exhaust gas [m/s]. m=Mass flow rate of exhaust gas [g/s]. $A_{pg}$=Cross sectional area of exhaust pipe [m$^2$]. $A_E$=Surface area of sensor element [m$^2$]. $A_H$=Surface area of heater [m$^2$]. $L_E$=Thickness of sensor element [m]. $L_H$=Thickness of heater [m].

Given a nonlinear plant model:

$$\frac{dT_H}{dt} = \frac{K_o}{e_H v_H c_{v_H}} i^2 + \frac{K_1}{e_H v_H c_{v_H}} T_H i^2 - \frac{273 K_1}{e_H v_H c_{v_H}} i^2, \quad (1)$$

$$\frac{dT_E}{dt} = \frac{K_E A_E}{L_E e_E v_E c_{vE}} T_H - \frac{K_E A_E}{L_E e_E v_E c_{vE_H}} T_E, \quad (2)$$

$$\frac{dT_g}{dt} = \frac{B}{e_g v_g c_{p_g}} m^{0.8} T_g - \frac{B}{e_g v_g c_{p_g}} m^{0.8} T_E, \quad (3)$$

Let, $$C_0 = \frac{K_o}{e_H v_H c_{VH}}; \quad C_1 = \frac{K_1}{e_H v_H c_{VH}};$$

$$C_3 = \frac{273 K_1}{e_H v_H c_{VH}}; \quad C_4 = \frac{K_E A_E}{L_E e_E v_E c_{vE}};$$

$$C_5 = -C_4;$$

$$C_6 = \frac{B}{e_g v_g c_{p_g}};$$

$$C_7 = -C_6$$

and linearizing at operating points, $T_{H0}$, $T_{E0}$, $T_{G0}$, $i_0$, $m_0$, a linear state space model for the oxygen sensor heater subsystem is given by, $$\frac{d \Delta T_H}{dt} = (C_6 i_0^2) \Delta T_H + (2C_0 i_0 + 2C_1 T_{H0} i_0 - 2C_3 i_0) \Delta i \quad (1)$$

$$\frac{d \Delta T_H}{dt} = C_4 \Delta T_H + C_5 \Delta T_E, \quad (2)$$

$$\frac{d \Delta T_g}{dt} = (C_6 m^{0.8}) \Delta T_g + (0.8 C_6 m^{-0.2} T_{g0} + 0.8 C_7 T_{E_0} m_0^{-0.2}) \Delta m + \quad (3)$$

$$(C_7 m_0^{0.8}) \Delta T_E,$$

Let, $R_0 = C_1 i_0^2$, $R_1 = 2C_0 i_0 + 2C_1 T_{H0} i_0 - 2C_3 i_0$, $R_2 = C_4$, $R_4 = C_6 m^{0.8}$, $R_3 = C_5$, $R_6 = C_7 m_0^{0.8}$, $R_5 = 0.8 C_6 m^{-0.2} T_{g0} + 0.8 C_7 T_{E_0} m_0^{0.2}$,

A linearized system equation for control and estimator design is defined by the following equations:

$$\frac{d \Delta T_H}{dt} = R_0 \Delta T_H + R_1 \Delta i, \quad (1)$$

$$\frac{d \Delta T_E}{dt} = R_2 \Delta T_H + R_3 \Delta T_E, \quad (2)$$

$$\frac{d \Delta T_g}{dt} = R_4 \Delta T_g + R_5 \Delta m + R_6 \Delta T_E, \quad (3)$$

Figure 3:
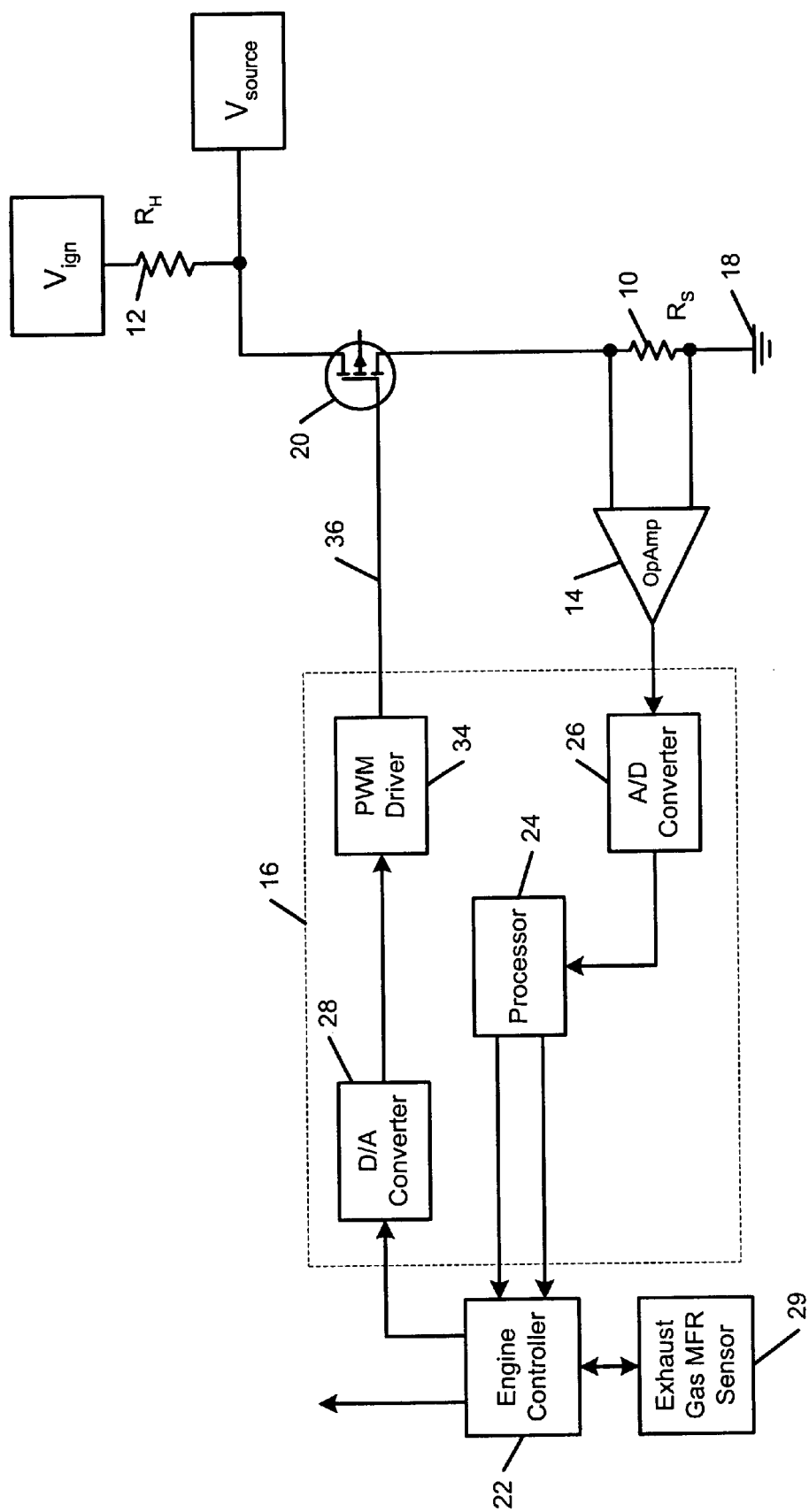
FIG. 3 is a functional block diagram of the control system according to the present invention.

Referring now to FIG. 3, an exhaust gas oxygen sensor heater that heats the oxygen sensor is represented by a resistor $R_H$ 12, which is a temperature dependent resistance. A current sensor resistor is represented by a resistor $R_S$ 10. An operational amplifier 14 supplies an output voltage $V_{amp}$ that is proportional to the voltage across the resistor 10 to a control module 16.

One end of the resistor 10 is connected to ground 18 and the other end of the resistor 10 is connected to a drain of a MOSFET 20. A source of the MOSFET 20, represented by $V_{source}$, is connected through the heater resistor 12 to an ignition voltage $V_{ign}$. Preferably, $V_{ign}$ is the operating voltage of the control module 16.

The control module 16 is connected to an engine controller 22 that can be implemented as software that is executed by a processor and memory, as an application specific integrated circuit or in any other suitable manner. The controller module 16 includes a processor 24 and analog to digital (A/D) converters 26 and 28. An exhaust gas mass flow rate sensor 29 is connected to the engine controller 22. The controller 16 also includes read only memory (ROM), random access memory (RAM), and an input/output interface (not shown). Preferably, the converters 26 and 28 are 8-bit converters although other converters can be used. The control module 16 is activated by $V_{ign}$ when the engine is started. When activated, the control module 16 executes engine control, diagnostic and maintenance operations as will be described below. In a preferred embodiment, the control module 16 is a Motorola Model No. MC68332.

Figure 4:
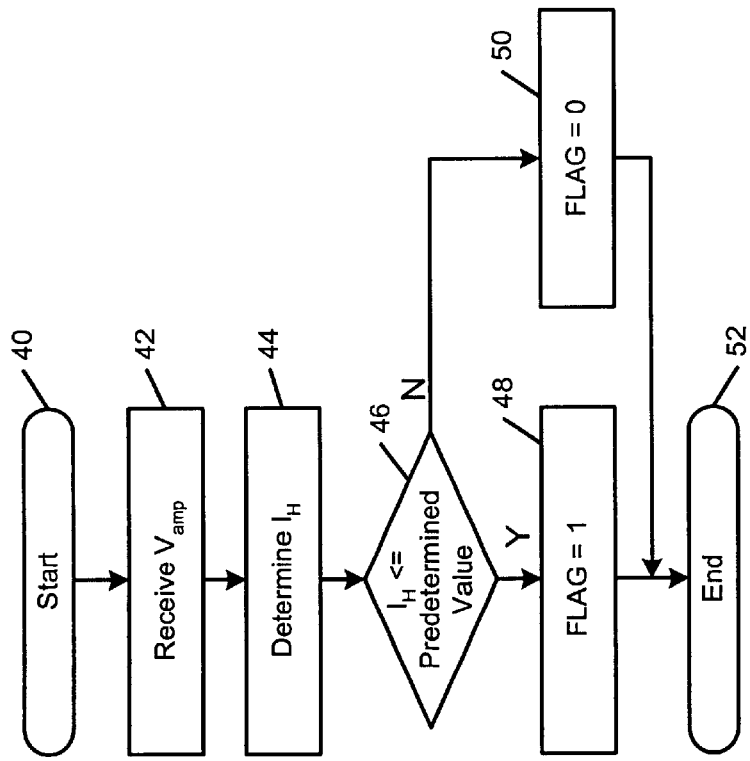
FIG. 4 is a flowchart of an algorithm performed by the present invention.

Referring now to FIG. 4, steps performed by the processor 24 of the control module 16 are shown. Control begins at step 40. In step 42, the converted output voltage $V_{amp}$ of the operational amplifier 14 is received by control module. In step 44, the output voltage $V_{amp}$ is used to determine the actual current flowing through the heater resistor 12. The actual current $I_H = V_{amp}/R_S$, where $V_{amp}$ is the converted output voltage of the operational amplifier 14; $R_S$ is the resistance of the sensor resistor 10; and $I_H$ is the actual current through the heater 12.

The processor 24 determines whether the heater is operating outside of the manufacturer's specification. In step 46, $I_H$ is compared to a predetermined current value. For example, a typical value that would indicate a problem with the heater is $10^{-8}$ amps. In step 48, if $I_H$ is less than or equal to a predetermined current value, a diagnostic code FLAG is set equal to one. If however, $I_H$ is greater than the predetermined value then FLAG is set equal to zero in step 50.

Returning now to FIG. 3, the current $I_H$ through the heater 12 and the diagnostic code FLAG are output by the processor 24 to the engine controller 22 that performs additional steps described below in conjunction with FIGS. 3 and 4. The controller 22 employs the inputs $I_H$ and FLAG to generate the exhaust gas temperature 30 and a control signal 32. The control signal 32 is converted by the D/A converter 28 and output to a voltage controlled, pulse width modulated (PWM) driver 34. The gate of the MOSFET 20 receives a pulsed signal 36 from the PWM driver 34. The duration of the pulses determines the amount of current that is supplied to the heater 12 and the temperature of the heater 12.

Figure 5:
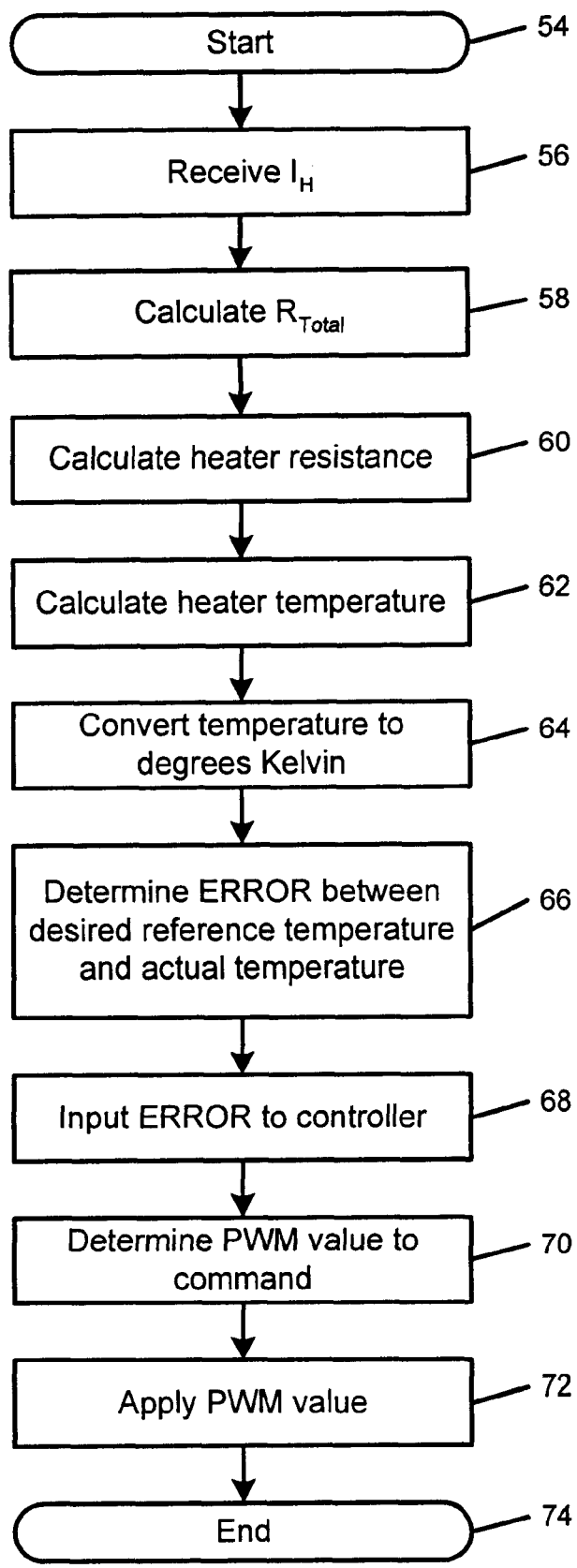
FIG. 5 is a flowchart that is used to control the oxygen sensor heater.

Referring now to FIG. 5, steps for controlling the oxygen sensor heater are shown. Control begins at step 54. In step 56, the current $I_H$ through the heater 12 is received from the control module 16. In step 58, the total resistance of the sensor resistor 10 and the heater resistor 12 are determined according to the following formula:

$(V_{ign} - V_{drain})/I_H = R_{total}$, where $V_{ign}$ is the ignition voltage (in volts); $V_{drain}$ is the voltage (in volts) at the drain pin of the MOSFET 20; $I_H$ is the actual current through the heater 12, as determined in step 44 of FIG. 2; and $R_{total}$ is the total resistance of the current sensor resistance 10 and the heater 12.

In step 60, the resistance of the heater 12 is determined according to the following formula:

$R_{total} - R_S = R_H$, $R_{total}$ is the total resistance of the sense resistor 10 and the heater resistor 12, as calculated in step 58, $R_S$ is the resistance of the sense resistance 10 $R_s$ is a predetermined value based on the specification of the heater & MOSFET driver. $R_H$ is the resistance of the heater 12 in ohms.

Since the resistance of the heater 12 as defined by the manufacturer is $R_H = K_0 + (K_1 * \text{Temperature})$, the measured temperature of the heater 12 is calculated in step 62 according to the following formula:

$$(R_H - K_0)/K_1 = T_1(t),$$

$R_H$ is the resistance of the heater 12 in ohms. $K_0$ is the heater resistance parameter in ohms. $K_1$ is the heater resistance coefficient in ohms per ° C. $T_1(t)$ is the actual temperature in degrees Celsius (° C.) of the heater 12 at time t. $K_0$ and $K_1$ are constants that depend on the wattage of the heater selected and are provided by the manufacturer of the heated exhaust gas sensor.

In step 64, the actual temperature is converted to temperature in degrees Kelvin (° K) according to the following formula:

$$T(t) = T_1(t) + 273.15$$

In step 66, an ERROR between the derived temperature and a desired temperature is calculated. The desired temperature is an experimentally derived constant temperature. For example, the desired temperature can be 750° C. (1023.15° K). The resultant ERROR is input into a state feedback controller in step 70. The gains of the state feedback controller are derived as a function of the target current which also control the heater temperature of the oxygen sensor heater.

The control signal 32 from the state feedback controller is output by the engine controller 22 to the control module 16 in step 72. The D/A converter 28 outputs a signal to the PWM driver 34 in step 74 to regulate the duty cycle of the PWM driver 26. The pulsed signal 36 supplied to the gate of the MOSFET 20 in step 76 drives the MOSFET 20. Generally, the MOSFET 20 operates as a switch that allows current to flow through the heater 12 when the MOSFET 20 is enabled. The amount of time that the MOSFET 20 is enabled varies the amount of current flowing through the heater 12. Specifically, the current supplied to the heater 12 is represented by the formula:

$$\text{Beta} \ast \text{Duty\_Cycle} = I_{supplied},$$

Where Beta is the proportionality constant and Duty_Cycle is the duty cycle of the pulsed signal 36 generated by the PWM driver 34. The control sequence ends at step 78. The control sequence is preferably performed synchronously with the sampling operation.

Figure 6:
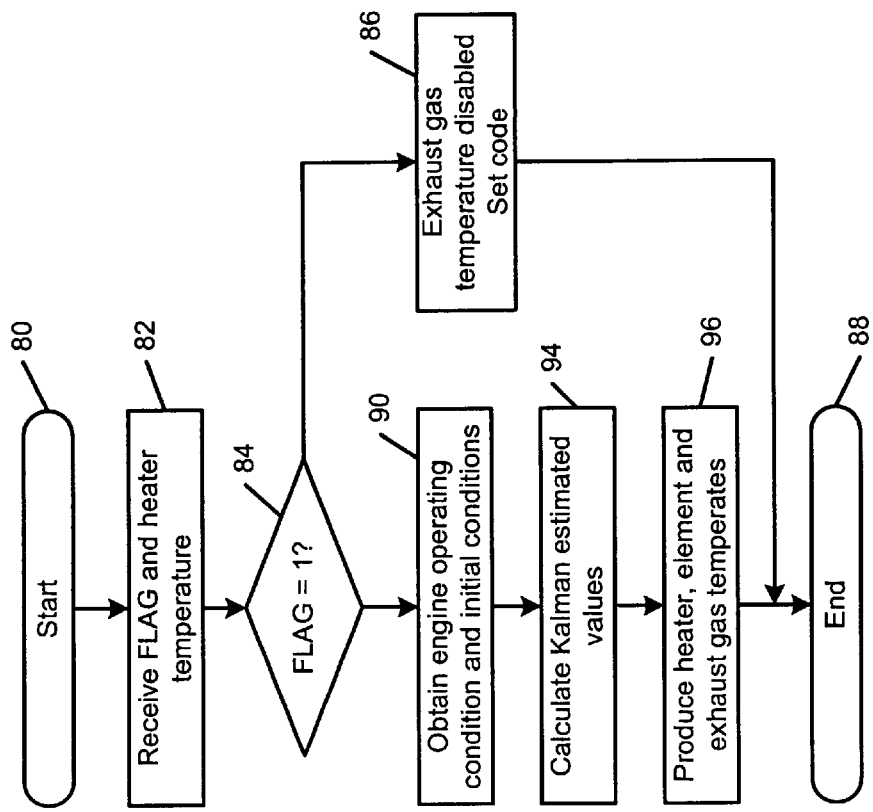
FIG. 6 is a flowchart that is used to determine exhaust gas temperature.

Referring now to FIG. 6, steps for determining the exhaust gas temperature are shown. Control begins at step 80. In step 82 the diagnostic code FLAG that was set in either step 48 or step 50 in FIG. 2 and the heater temperature from step 64 in FIG. 3 are polled. In step 84, the value of FLAG is checked. If FLAG is equal to one, a disabled code is set in step 86 to signify that the exhaust gas temperature cannot be used. Control ends at step 88. Returning to step 84, if FLAG is not equal to one, then control calculates the exhaust gas temperature.

The exhaust gas temperature is preferably estimated using a Kalman estimator. The measured heater current and the mass air flow measurement are input to the Kalman estimator that calculates the oxygen sensor heater temperature, the oxygen sensor element temperature, and the exhaust gas temperature. The Kalman estimator relates each of the input variables including the measured current and the mass air flow sensor to the outputs including the exhaust gas temperature, the oxygen sensor element temperature, and the oxygen sensor heater temperature. The Kalman estimator is preferably implemented in software using the following equations. The Kalman estimator calculates the exhaust gas temperature, oxygen sensor element temperature, and oxygen sensor heater temperature at time k:

$$\begin{bmatrix} x_1 \\ x_2 \\ x_3 \\ x_4 \end{bmatrix} = \overbrace{\begin{bmatrix} R_4 & R_6 & 0 & R_8 \\ 0 & R_3 & R_2 & 0 \\ 0 & 0 & R_0 & 0 \\ 0 & 0 & 0 & 1 \end{bmatrix}}^{A_e} \begin{bmatrix} x_1 \\ x_2 \\ x_3 \\ x_4 \end{bmatrix} + \overbrace{\begin{bmatrix} 0 \\ 0 \\ R_1 \\ 0 \end{bmatrix}}^{B_e} U_1$$

$$y = \underbrace{[1 \; 1 \; 1 \; 1]}_{C_e} \begin{bmatrix} x_1 \\ x_2 \\ x_3 \\ x_4 \end{bmatrix}$$

States    Input
$x_1 = \Delta T_g$
$x_2 = \Delta T_E \quad U_1 = \Delta i$
$x_3 = \Delta T_H$
$x_4 = \Delta m$ Using a Zero order hold and discretizing the estimator matrix results in the discrete state space representation of the estimator matrices. That is, $$\Phi_e = \epsilon^{A_e T}$$

$$\Gamma_e = \int_0^T \epsilon^{A_e \eta} d\eta B_e$$

$$H_e = C_e$$

The $A_e$, $B_e$ and $C_e$ are the state estimator augmented matrices and the discrete estimator system model is defined:

$$\bar{x}(k+1) = \Phi_e \hat{x}(k) + \Gamma_e U(k)$$

$$\bar{y}(k) = H_e \bar{x}(k)$$

The estimator gains and state estimates are determined using the Kalman estimator as follows:

$$P(k) = M(k) - M(k) H_e^T [H_e M(k) H_e^T + R_v]^{-1} H_e M(k); \text{ and}$$

$$x(k) = x(k) - P(k) H_e T R_v^{-1} [y(k) - H_e x(k)].$$

The time-updated equations are:

$$M(k+1) = \Phi_e P(k) \Phi_e^T + \Gamma_1 R_w \Gamma_1^T; \text{ and}$$

$$x(k+1) = \Phi_e x(k) + \Gamma_e u(k).$$

P(k) is the estimate accuracy immediately after a measurement at time k. M(k) is the propagated value of P(k) and is valid just before measurement. M(k+1) is the time updated value of P(k) and is valid after measurement. $\Phi_e$, $\Gamma_e$, and $H_e$ calculated using equation 5. $R_v$ is the noise level from the sensing activity and electronics (predetermined). x(k) are the state estimates at time k, including: $x_1(k)$, which is the state estimate of exhaust gas temperature at time k; and $x_1$ (x+1) at time k+1. $x_2(k)$, which is the state estimate of the sensor element temperature at time k; $x_3(k)$, which is the state estimate of the heater temperature at time k; and, $x_4(k)$, which is the state estimate of the mass air flow rate at time k. $\Gamma_1$ is the noise disturbance distribution matrix. $R_w$ is the predetermined process noise level.

The output of the Kalman estimator obtained in step 96 is the exhaust gas temperature 30, which can be used for engine control and diagnostics. Control ends at step 88 and then repeats while the engine is operating.

Thus, the present invention provides a unique apparatus and method capable of calculating both exhaust gas temperature and controlling the heater of an oxygen sensor. It eliminates the need for a separate temperature sensor yet maintains the accuracy of such a sensor. By controlling the amount of current through the heater, electrical consumption is reduced and the possibility of damage to the heated exhaust gas oxygen sensor due to excessive temperatures is reduced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. In a vehicle including an engine, an exhaust, and an exhaust gas oxygen sensor with a sensor heater, a system for estimating exhaust gas temperature, comprising:
   a first sensor that measures heater current though said heater;
   a second sensor that measures a first engine operating parameter; and
   a controller that communicates with said first and second sensors and that calculates an exhaust gas temperature value using a Kalman filter.

2. The system of claim 1 wherein said Kalman filter receives said first engine operating parameter and said heater current as inputs.

3. The system of claim 1 wherein said second sensor is a mass flow rate sensor and said first engine operating parameter is a mass flow rate of said exhaust gas of said vehicle.

4. The system of claim 1 wherein said controller maintains a temperature of said heater within an operating temperature range and further comprising a voltage sensor that generates a sensor voltage signal based on voltage across said exhaust gas oxygen sensor and wherein said controller calculates current through said heater based upon said sensor voltage signal and a sensor resistance.

5. The system of claim 4 wherein said controller calculates total resistance based upon said current through said heater and a voltage drop across said heater.

6. The system of claim 5 wherein said controller calculates a resistance of said heater based on a difference between said total resistance and said sensor resistance.

7. The system of claim 6 wherein said controller calculates a temperature of said heater based on said heater resistance.

8. The system of claim 7 wherein said controller calculates an error signal based on a difference between said heater temperature and said operating temperature range and varies a temperature of said heater based on said error signal.

9. The system of claim 1 wherein said controller generates an estimate of oxygen concentration in said emissions.

10. The system of claim 1 wherein said controller controls emission levels of said vehicle based in part on said exhaust gas temperature.

11. In a vehicle including an engine, an exhaust, and an exhaust gas oxygen sensor with a sensor heater, a method for estimating exhaust gas temperature, comprising:
    measuring heater current though said heater;
    measuring a first engine operating parameter; and
    calculating an exhaust gas temperature value using a Kalman filter.

12. The method of claim 11 wherein said Kalman filter receives said first engine operating parameter and said heater current as inputs.

13. The system of claim 11 wherein said second sensor is a mass flow rate sensor and said first engine operating parameter is a mass flow rate of exhaust gas of said vehicle.

14. The system of claim 11 further comprising:
    maintaining a temperature of said heater within an operating temperature range; generating a sensor voltage signal based on voltage across said exhaust gas oxygen sensor; and
    calculating current through said heater based upon said sensor voltage signal and a sensor resistance.

15. The system of claim 14 further comprising calculating total resistance based upon said current through said heater and a voltage drop across said heater.

16. The system of claim 15 further comprising calculating a resistance of said heater based on a difference between said total resistance and said sensor resistance.

17. The system of claim 16 further comprising calculating a temperature of said heater based on said heater resistance.

18. The system of claim 17 further comprising calculating an error signal based on a difference between said heater temperature and said operating temperature range and varying a temperature of said heater based on said error signal.

19. The system of claim 11 further comprising generating an estimate of oxygen concentration in said emissions.

20. The system of claim 11 further comprising controlling emission levels of said vehicle based in part on said exhaust gas temperature.

* * * * *